United States Patent [19]

Noji

[11] Patent Number: 4,790,135

[45] Date of Patent: Dec. 13, 1988

[54] STEADY OPERATION METHOD FOR HYDRAULIC MACHINE OPERATING AT VARIABLE SPEED

[75] Inventor: Osamu Noji, Odawara, Japan

[73] Assignee: Kabushiki Kaisha Toshiba, Kawasaki, Japan

[21] Appl. No.: 42,254

[22] Filed: Apr. 24, 1987

[30] Foreign Application Priority Data

Apr. 26, 1986 [JP] Japan .................................. 61-97100

[51] Int. Cl.$^4$ ............................................. F16D 31/00
[52] U.S. Cl. ......................................... 60/327; 60/452
[58] Field of Search ................... 60/338, 329, 327, 452

[56] References Cited

U.S. PATENT DOCUMENTS 3,987,626 10/1976 Bianchetta ............................ 60/452
4,559,778 12/1985 Krusche .................................. 60/452

FOREIGN PATENT DOCUMENTS 56282 5/1977 Japan .................................... 60/452

Primary Examiner—Robert E. Garrett
Assistant Examiner—John T. Kwon
Attorney, Agent, or Firm—Foley & Lardner, Schwartz, Jeffery, Schwaab, Mack, Blumenthal & Evans

[57] ABSTRACT

A steady operation method for a hydraulic machine such as a generator operating at a variable revolution speed is performed in accordance with the following steps. A head or load of the hydraulic machine is first detected and a basic signal is obtained on the basis of the thus detected value so as to control the revolution speed of the hydraulic machine. On the other hand, a vibration or hydraulic pressure variation is detected and the thus detected value is converted into an auxiliary signal through an auxiliary signal converter. The revolution speed of the hydraulic machine operating at a variable speed is controlled in such a manner as that the revolution speed is controlled by the basic signal when the auxiliary signal is below a predetermined upper limit thereof regarding the vibration or hydraulic pressure variation, and otherwise, the revolution speed is controlled by a signal other than the basic signal when the auxiliary signal is beyond the upper limit thereof.

7 Claims, 2 Drawing Sheets

STEADY OPERATION METHOD FOR HYDRAULIC MACHINE OPERATING AT VARIABLE SPEED

BACKGROUND OF THE INVENTION

This invention relates to a steady operation method for a variable hydraulic machine or machinery under the steadily operating condition capable of controlling or limiting the vibration of the hydraulic machine or the increasing of a pressure variation due to the variation of the revolution speed in a hydroelectric power plant operated at a variable speed.

Recently, variable operating systems have been developed and utilized as systems for operating the hydraulic machine with the highest efficiency such as water turbines and pump turbines with large head variable and load variable (for example, refer to Japanese Patent Laid-Open Publication Nos. 57-113971, 58-18595 and 58-222981).

The outline of the variable operating system of the type described above will be explained briefly hereunder in conjunction with FIGS. 1 through 3.

FIG. 1 is a graph having the abscissa representing the revolution speed $n_1$ per a unit head and the ordinate representing the flow rate $q_1$ per a unit head and the graph shows the constant efficiency curve 21 and the maximum efficiency curve 22, wherein character $n_1$ equals to $N/\sqrt{H}$, $q_1 = Q/\sqrt{H}$ and $p = a\eta QH$, and letter N designates revolution speed, Q: flow rate, H: head, p: output, $a$: constant, and $\eta$: efficiency.

As will be understood from FIG. 1, under the conditions of $H = \sqrt{H_0}$ and $Q = Q_0$, i.e. $q_1 = q_0 (= Q_0/H_0)$, the maximum efficiency can be obtained at only the point A on which the revolution speed $n_0$ is designated by $n_0 = N_0/\sqrt{H_0}$.

FIG. 2 is a graph representing the relationship between the flow rate Q and the efficiency $\eta$ with respect to the water turbine output p in a case where the revolution speed $n_1$ is constant per the unit head, i.e. $n_1 = n_0$ and the maximum efficiency is obtained by only the point B, which corresponds to the point A of FIG. 1.

In FIG. 1, a broken line 22 shows the maximum efficiency curve combining the loci of the maximum efficiency points with respect to the flow rate $q_1$ and the revolution speed $n_1$ to the unit head, and the maximum efficiency curve corresponding to that of FIG. 2 is shown by a broken line 32 in FIG. 2.

FIG. 3 is a block diagram of one example of a variable speed operation system for controlling the revolution speed so as to always achieve the most effective operation in accordance with the head or the load. In the system illustrated in FIG. 3, the head H and the load L are detected by a head detecting device 1 and a load detecting device 2, respectively, and signals representing the detected head and load are then transmitted from these devices 1 and 2 into a signal converter 3 thereby to calculate the most available revolution speed N, which is converted into a revolution speed signal which is thereafter transmitted into a revolution speed controller 4. According to this manner, a generator or generator-motor 5 and a hydraulic machine directly connected thereto can be operated at the most available revolution speed N.

In the conventional technique described hereinbefore, the most available revolution speed N in the variable speed operation of the hydraulic machine 6 is merely set in accordance with the head H or the load L based on the performance condition of the hydraulic machine 6, and in other words, the revolution speed N is merely outputted as a revolution speed signal from the signal converter 3 or the like.

In general, however, in a variable hydraulic machine, the revolution speed of the hydraulic machine is varied, so that the hydraulically vibrating frequency applied by hydraulic influence due to a runner of the machine to a stationary portion, not shown, such as an upper cover and the hydraulically vibrating frequency applied by hydraulic buffer from a guide vane on the stationary side to the runner are varied in accordance with the variation of the revolution speed.

Accordingly, during the process of changing the revolution speed, in a case where the hydraulically vibrating frequency accords with the natural frequency of the hydraulic machine, an excessive abnormal vibration will be generated by the resonance phenomenon, which may result in the unoperable condition of the hydraulic machine.

On the other hand, with a hydraulic machine operating at a constant revolution speed, the resonance phenomenon mentioned above can be obviated by designing the hydraulic machine so that the natural frequency of the machine is not in accord with the hydraulically vibrating frequency. With the hydraulic machine operating at the variable revolution speed for the high performance operation, however, the resonance phenomenon will occur when the hydraulically vibrating frequency is overlaped, even though temporarily, with the natural frequency, and thus, the problem of the resonance phenomenon cannot be obviated and constitutes a matter to be solved.

SUMMARY OF THE INVENTION

An object of this invention is to substantially eliminate the defects or disadvantages of the background art of this technical field and to provide a method for controlling a revolution speed of a hydraulic machine with substantially no abnormal excessive vibration or hydraulic pressure variation in a case of steadily operating a hydraulic machine operating at a variable speed by varying the revolution speed thereof in response to the head or the load in consideration of the waterflow performance condition.

According to this invention, this and other objects can be achieved by a steady operation method for a hydraulic machine operating at a variable revolution speed which is controlled in accordance with a head or load at a steady operation of the hydraulic machine, the method comprising the steps of detecting a head or load of a hydraulic machine, obtaining a basic signal in response to the thus detected value so as to control the revolution speed of the hydraulic machine, detecting parallelly a vibration or hydraulic pressure variation of the hydraulic machine, converting the thus detected value into an auxiliary signal through an auxiliary signal converter, and controlling the revolution speed of the hydraulic machine operating at a variable speed in such a manner as that when the auxiliary signal is below a predetermined upper limit thereof regarding the vibration or the hydraulic pressure variation, the revolution speed is controlled by the basic signal, and otherwise, when the auxiliary signal is beyond the predetermined upper limit, the revolution speed is controlled by a signal other than the basic signal.

In the method of this invention achieved by the steps described above, as seen in a conventional method, a head H or a load L are detected by a head detecting device and a load detecting device, respectively, and the thus detected values are inputted into a signal converter from which, thereafter, a revolution control signal set by a performance condition of the hydraulic machine is outputted as a basic signal x. The basic signal x is utilized for controlling the variable speed operated hydraulic machine with the highest efficiency.

In the meantime, a vibration or hydraulic pressure variation is detected by a vibration detecting device or hydraulic pressure variation detecting device, and the thus detected value is inputted into an auxiliary signal converter to obtain an auxiliary signal y.

The thus obtained basic signal x and the auxiliary signal y are then inputted into a comparing and operating device to obtain an output signal N, which is then transmitted into a revolution speed controller thereby to control the hydraulic machine such as a generator or a generator-motor.

The comparing and operating device compares the auxiliary signal y with the preset upper limit $y_0$ of the auxiliary signal y and controls the output to be transmitted into the revolution speed controller in consideration of the relationship between the auxiliary signal y and the upper limit $y_0$ thereof. The output signal N can be changed, for example, as follows by changing the content of the comparing and operating signal.

(a) In case of $y \leq y_0$, $N=x$, and in case of $y > y_0$, $N=x_0$ ($x_0$: a standard value of the revolution speed of the hydraulic machine). Corresponding to a design point predetermined under normal operating conditions.

(b) In case of $y \leq y_0$, $N=x$, and in case of $y > y_0$, $N=x+\frac{1}{2}(x_0-x)$.

(c) In case of $y \leq y_0$, $N=x$, and in case of $y > y_0$, $N=(1 \pm \Delta)x$ ($\Delta$: a constant below 1).

The effects and the advantages attained by the modes of the method of this invention referred to hereinabove will be apparent from the disclosure to be described hereinafter in conjunction with the accompanying drawings.

DESCRIPTION OF THE PREFERRED EMBODIMENTS

The steady operation method for a hydraulic machine or machinery operated at a variable speed, according to this invention will be explained in detail hereinbelow through preferred embodiments in conjunction with the accompanying drawing.

(EXAMPLE 1)

Figure 1:
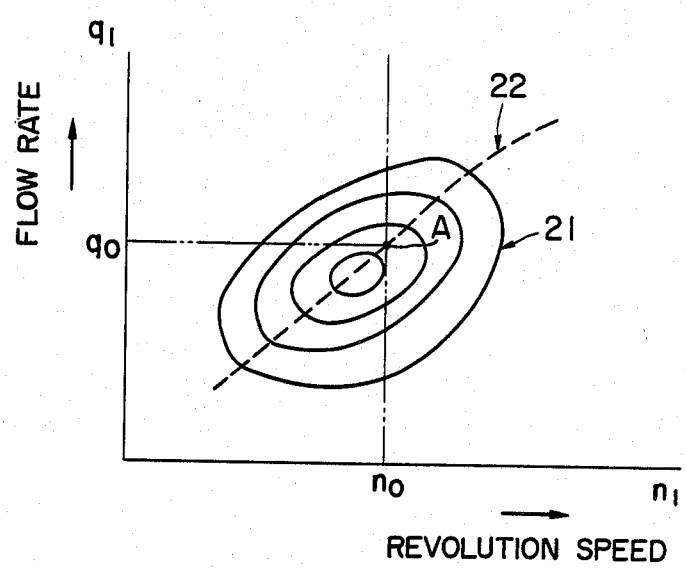
FIG. 1 is a graph showing curves representing a general water turbine performance of a hydraulic machine utilized for explaining a system operated at a variable speed.
Figure 2:
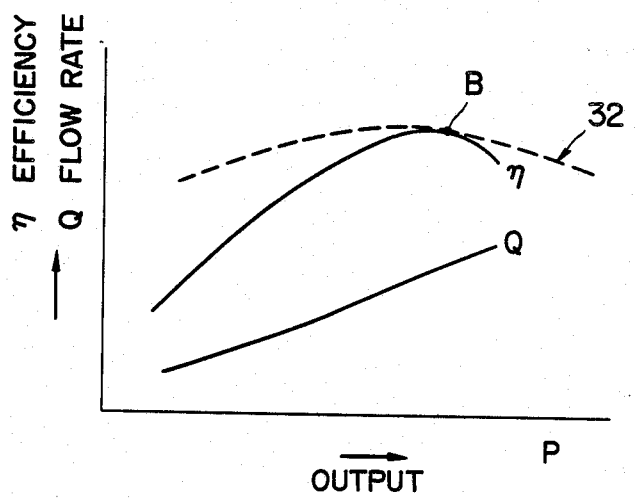
FIG. 2 is a graph showing curves representing the relative relationship between an output, a flow-rate and an efficiency under the operation of the hydraulic machine at a constant revolution speed and a constant head.
Figure 3:
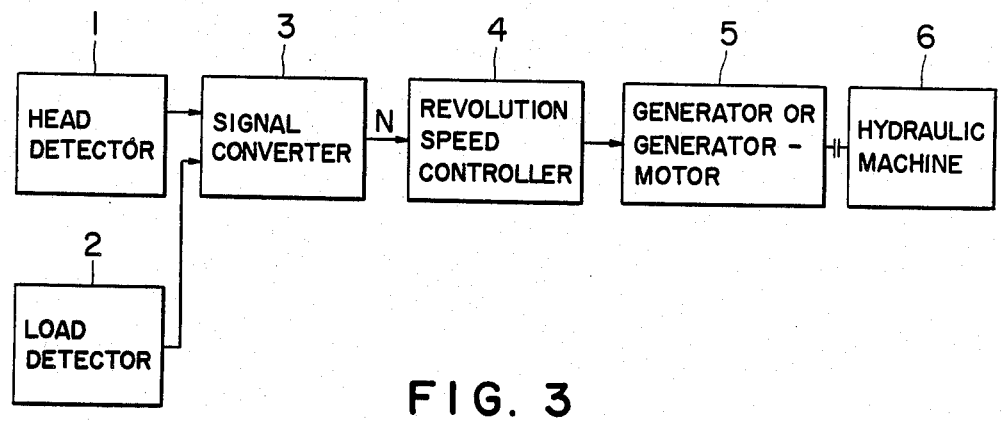
FIG. 3 is a block diagram showing a device utilized in a conventional system operated at a variable speed.
Figure 4:
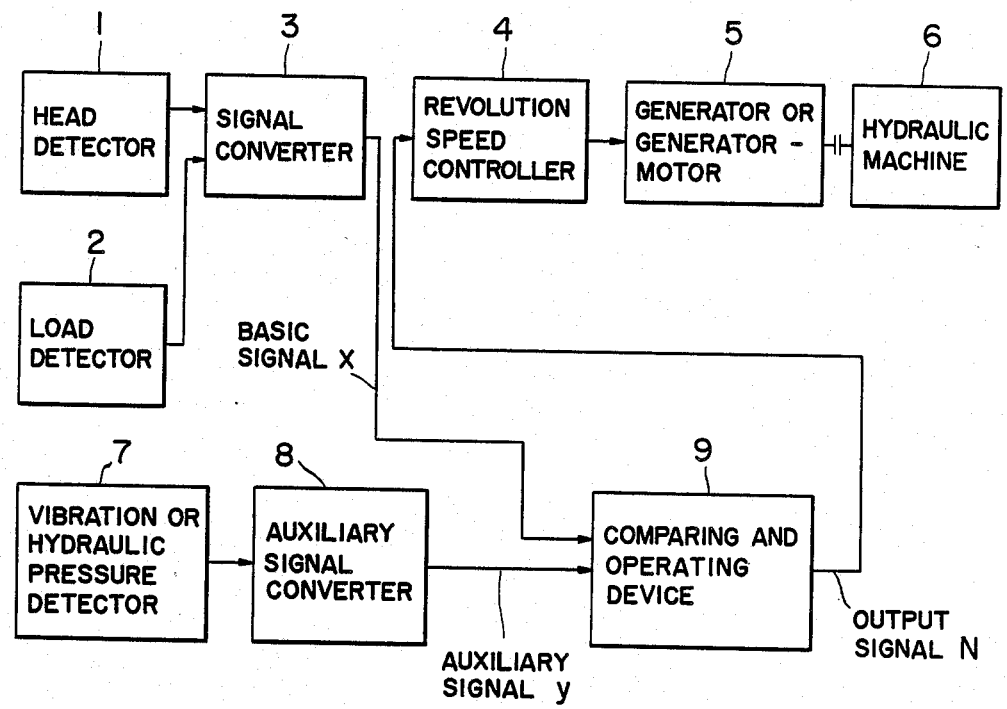
FIG. 4 shows a block diagram of an embodiment of a device adapted for carrying out a method according to this invention.

Referring to FIG. 4 showing a block diagram of a system to be applicable to the method of this invention, the head H or the load L are detected by the head detecting device 1 and the load detecting device 2, respectively. Signals regarding the head H or the load L from these detectors 1 and 2 are inputted into the signal converter 3 in which the signals are converted into a revolution control signal preset in consideration of the performance conditions of the hydraulic machine and then outputted therefrom as a basic signal x into a comparing and operating device 9.

Vibrating value or hydraulic pressure varying value of the hydraulic machine 6 is detected by a vibrator detector or hydraulic pressure variation detector 7, and the thus detected value is transmitted as a signal to an auxiliary signal converter 8 in which an auxiliary signal y is operated in accordance with the vibration and the hydraulic pressure variation and then outputted towards the comparing and operating device 9.

In the comparing and operating device 9, the upper limit value $y_0$ of the auxiliary signal y regarding the hydraulic pressure variation or the vibration is preliminarily stored and the auxiliary signal y and the upper limit value $y_0$ thereof are then compared. On the basis of the comparison result, is transmitted an output signal N is transmitted, which will be operated in the following manner in accordance with the value of the auxiliary signal y.

(1) In case of $y \leq y_0$; that is, when the vibration or hydraulic pressure variation is below the upper limit $y_0$, "$N=x$" is set; that is, the basic signal x is outputted as it is.

(2) In case of $y > y_0$; that is, when the vibration or hydraulic pressure variation is beyond the upper limit $y_0$, "$N=x_0$" is set; that is, the standard value of the revolution speed of the hydraulic machine is outputted as it is.

In accordance with these manners, the output signal N transmitted from the comparing and operating device 9 on the basis of the comparison made between the auxiliary signal y and the upper limit $y_0$ thereof is then inputted into the revolution speed converter 4 such as a cycloconverter, and accordingly, the operations of the generator or generator-motor 5 and the hydraulic machine 6 connected thereto are controlled with the revolution speed based on the output signal N.

As described hereinabove, in the embodiment of this invention, the hydraulic machine is operated with the selected revolution speed so as to attain the operation with the highest efficiency in accordance with the head or load, and in a case where the vibration or the hydraulic pressure variation value is below the predetermined upper limit, the basic signal x is outputted as the output signal N due to the operation of the comparing and operating device 9, thus the hydraulic machine being operated with the highest efficiency.

In the meantime, during the revolution speed varying process of the hydraulic machine, when the vibration and the hydraulic pressure variation increases and is beyond the predetermined upper limit value $y_0$, the standard value $x_0$ of the revolution speed of the hydraulic machine is outputted as the output signal N due to the operation of the comparing and operating device 9.

The hydraulic machine is therefore safely operated steadily with the basic revolution speed without being adversely affected by the resonance phenomenon.

(EXAMPLE 2)

Although in this example, the basic construction is substantially the same as that shown in the block diagram of FIG. 4, the comparing and operating device 9 of this example operates as follows.

(1) In case of $y \leq y_0$; that is, when the vibration or hydraulic pressure variation is below the upper limit $y_0$, "$N=x$" is set; that is, the basic signal N is outputted as it is.

(2) In case of $y > y_0$; that is, when the vibration or hydraulic pressure variation is beyond the upper limit $y_0$, the equation "$N = x + \frac{1}{2}(x_0 - x) = (x + x_0)\frac{1}{2}$" ... (1) is set; that is, the output signal N is outputted as the average value of the basic signal x and the standard value $x_0$. The construction other than the comparing and operating device 9 of the system of the Example 2 is the same as that of the Example 1 shown in FIG. 4.

With this Example 2, in a case where the vibration or hydraulic pressure variation is below the upper limit $y_0$, the operation of the hydraulic pressure can be controlled at the most available revolution speed in accordance with the head or the load based on the basic signal x, and when the vibration or hydraulic pressure variation is beyond the upper limit $y_0$, the operation of the hydraulic machine can be continued by the modified operation of the revolution speed with the condition satisfying the equation (1) till the hydraulic machine is operated with the revolution speed under a condition in which the vibration or hydraulic pressure variation becomes below the upper limit $y_0$ between the initial basic signal x and the revolution speed standard value $x_0$.

According to the manner described above, with the Example 2, the hydraulic machine can be operated with the effects described hereinbefore with reference to the Example 1 and the operation can be steadily continued at the revolution speed near the most suitable revolution number, thus being effectively operated.

(EXAMPLE 3)

In this Example 3, the output signal N, which is the output signal in case of $y > y_0$ in the Example 1, is set to $N = (1 \pm \Delta)x$, in which the symbol $\Delta$ is a constant below 1 or a value, $\Delta = (y - y_0)/y_0$, to be determined in accordance with the relative difference between the auxiliary signal y and the upper limit $y_0$. With this Example 3, although the revolution speed correcting operation is continued till the revolution speed becomes a value at which the vibration or hydraulic pressure variation of the hydraulic machine, the controlling time can be effectively reduced in comparison with the case of the Example 2 because the variation extent of the output signal N with respect to the basic signal x becomes large as the relative difference becomes large.

(EXAMPLE 4)

With the respective foregoing Examples, although the upper limit $y_0$ of the auxiliary signal y in response to the vibration and the hydraulic pressure variation is disclosed as a constant value preliminarily set, the upper limit $y_0$ may be referred to as a value to be changed in accordance with the head or the load. According to this manner, the hydraulic machine can be effectively operated; that is, the vibration or the hydraulic pressure variation of the hydraulic machine at the steady operation thereof tends to generally become large as the head or the load is apart from the design point. Accordingly, in a case where the head or the load is far apart from the design point, the available steady operation range can be enlarged by increasing the upper limit value $y_0$ within the allowable range, thus enabling the more effective operation.

As described hereinbefore, according to this invention, a hydraulic machine which is operated at a revolution speed controlled by the basic signal x in response to the head or the load can be controlled with the maximum efficiency revolution speed by the basic signal x in a case where the auxiliary signal y in response to the vibration or hydraulic pressure variation of the machine is below the upper limit $y_0$ thereof, and otherwise, by a signal other than the basic signal x in a case where the auxiliary signal y is beyond the upper limit $y_0$ thereof thereby to suppress the generation of the resonance phenomenon, whereby the vibration or hydraulic pressure variation can be controlled below the upper limit $y_0$ thereof and the hydraulic machine can be thus safely and steadily operated.

What is claimed is:

1. A steady operation method for a hydraulic machine operating at a variable revolution speed which is controlled in accordance with a head or load at a steady operation of the hydraulic machine, comprising the steps of:
    detecting a head or load of a hydraulic machine;
    obtaining a basic signal in response to a detected value of the head or load so as to control a revolution speed of the hydraulic machine;
    detecting parallelly a vibration or hydraulic pressure variation of the hydraulic machine;
    converting a detected value of the vibration or hydraulic pressure variation into an auxiliary signal; and
    controlling the revolution speed of the hydraulic machine operating at a variable speed in such a manner as that when the auxiliary signal is below a predetermined upper limit thereof regarding the vibration or the hydraulic pressure variation, said revolution speed is controlled by said basic signal, and otherwise, when the auxiliary signal is beyond said predetermined upper limit, said revolution speed is controlled by a signal other than said basic signal.

2. The steady operation method according to claim 1 wherein the revolution speed of the hydraulic machine operating at a variable speed is controlled by a standard value when said auxiliary signal is beyond said upper limit.

3. The steady operation method according to claim 1 wherein the revolution speed of the hydraulic machine operating at a variable speed is controlled by a signal obtained by compounding said basic signal and a standard value when said auxiliary signal is beyond said upper limit.

4. The steady operation method according to claim 1 wherein the revolution speed of the hydraulic machine operating at a variable speed is controlled by a signal obtained by constantly decreasing said basic signal when said auxiliary signal is beyond said upper limit.

5. The steady operation method according to claim 1 wherein the revolution speed of the hydraulic machine operating at a variable speed is controlled by constantly increasing a signal obtained by said basic signal when said auxiliary signal is beyond said upper limit.

6. The steady operation method according to claim 2 wherein said standard value is a value to be determined in response to the head or the load.

7. The steady operation method according to claim 3 wherein said standard value is a value to be determined in response to the head or the load.

* * * * *